(12) United States Patent
Ha et al.

(10) Patent No.: US 12,468,163 B2
(45) Date of Patent: Nov. 11, 2025

(54) OPTICAL DEVICE FOR AUGMENTED REALITY HAVING A FUNCTION OF ADJUSTING DEPTH OF A VIRTUAL IMAGE

(71) Applicant: LETINAR CO., LTD, Anyang-si (KR)

(72) Inventors: Jeong Hun Ha, Seoul (KR); Soon Gi Park, Seoul (KR)

(73) Assignee: LETINAR CO., LTD, Anyang-si (KR)

( * ) Notice: Subject to any disclaimer, the term of this patent is extended or adjusted under 35 U.S.C. 154(b) by 344 days.

(21) Appl. No.: 18/255,359

(22) PCT Filed: Jul. 9, 2021

(86) PCT No.: PCT/KR2021/008831
§ 371 (c)(1),
(2) Date: May 31, 2023

(87) PCT Pub. No.: WO2022/124510
PCT Pub. Date: Jun. 16, 2022

(65) Prior Publication Data
US 2024/0019706 A1  Jan. 18, 2024

(30) Foreign Application Priority Data
Dec. 10, 2020 (KR) .......................... 10-2020-0172721

(51) Int. Cl.
*G02B 27/01* (2006.01)
(52) U.S. Cl.
CPC ..... *G02B 27/0179* (2013.01); *G02B 27/0172* (2013.01); *G02B 2027/0185* (2013.01)

(58) Field of Classification Search
CPC .................................................. G02B 27/0179
See application file for complete search history.

(56) References Cited

U.S. PATENT DOCUMENTS

| | | | |
|---|---|---|---|
| 2018/0203232 A1 | 7/2018 | Bouchier et al. | |
| 2019/0361249 A1* | 11/2019 | Lanman | G06F 1/163 |

FOREIGN PATENT DOCUMENTS

| | | |
|---|---|---|
| JP | 2012008290 A | 1/2012 |
| KR | 1020130126623 A | 11/2013 |
| KR | 101409846 B1 | 6/2014 |
| KR | 101660519 B1 | 9/2016 |
| KR | 101789357 B1 | 10/2017 |
| KR | 1020200021670 A | 3/2020 |
| KR | 1020200136297 A | 12/2020 |

* cited by examiner

*Primary Examiner* — Edmond C Lau
(74) *Attorney, Agent, or Firm* — Rabin & Berdo, P.C.

(57) ABSTRACT

The present invention provides an optical device for augmented reality having a function of adjusting the depth of a virtual image, the optical device including: a display unit configured to display a virtual image; focusing optics configured to refract or reflect virtual image light; a reflective unit including a plurality of reflective modules configured to provide the virtual image to a user; an optical means provided with the reflective unit installed therein, and configured to transmit real object image light toward a pupil of the user's eye; a position adjustment device configured to move at least one of the display unit and the focusing optics in a direction parallel to the optical axis of the focusing optics; a focal length tracking unit configured to measure the focal length of the user; and a control unit configured to control the movement of the position adjustment device.

9 Claims, 6 Drawing Sheets

(a) (b)

OPTICAL DEVICE FOR AUGMENTED REALITY HAVING A FUNCTION OF ADJUSTING DEPTH OF A VIRTUAL IMAGE

TECHNICAL FIELD

The present invention relates to an optical device for augmented reality, and more particularly to an optical device for augmented reality having a function of adjusting the depth of a virtual image.

BACKGROUND ART

Augmented Reality (AR) refers to technology that superimposes a virtual image, generated by a computer or the like, on a real image of the real world and then provides a resulting image, as is well known.

To implement augmented reality, there is required an optical system that allows a virtual image, generated by a device such as a computer, to be superimposed on an image of the real world and a resulting image to be provided. As such an optical system, there is known a technology using an optical means such as a prism for reflecting or refracting a virtual image using a head-mounted display (HMD) or a glasses-type device.

However, devices using the conventional optical system have problems in that it is inconvenient for users to wear them because the configurations thereof are complicated and thus the weights and volumes thereof are considerable and in that the manufacturing costs thereof are high because the manufacturing processes thereof are also complicated.

Furthermore, the conventional devices have a limitation in that a virtual image becomes out of focus when a user changes focal length when gazing at the real world. To overcome this problem, there have been proposed technologies such as a technology using a configuration such as a prism capable of adjusting focal length for a virtual image and a technology for electrically controlling a variable focal lens in response to a change in focal length.

However, these technologies also have a problem in that a user needs to perform a separate operation to adjust focal length or hardware such as a separate processor and software for controlling focal length are required.

To overcome the problems of the conventional technologies, the present applicant has developed an optical device capable of implementing augmented reality by projecting a virtual image onto the retina through the pupil using a reflective unit having a size smaller than the pupil size of people, as described in patent document 1.

FIG. 1 is a diagram showing the optical device 100 for augmented reality as disclosed in patent document 1.

The optical device 100 for augmented reality shown in FIG. 1 includes an optical means 101, a reflective unit 102, an image output unit 103, and a frame unit 104.

The optical means 101 is a means for transmitting at least part of real object image light, which is image light output from a real object, therethrough, and may be, e.g., a lens of eyeglasses. The reflective unit 102 is embedded and disposed inside the optical means 101. Furthermore, the optical means 101 also functions to transmit the augmented reality image light, reflected by the reflective unit 102, therethrough in order to transfer the augmented reality image light to the pupil.

The frame unit 104 is a means for fixing and supporting both the image output unit 103 and the optical means 101, and may be, e.g., an eyeglass frame.

The image output unit 103 is a means for outputting augmented reality image light, which is image light corresponding to an image for augmented reality. For example, the image output unit 103 may include a small display device configured to display an image for augmented reality on a screen and to radiate augmented reality image light, and a collimator configured to collimate the image light, radiated from the display device, into parallel light.

The reflective unit 102 reflects image light corresponding to an image for augmented reality, output from the image output unit 103, toward the pupil of a user, thereby providing an image for augmented reality.

The reflective unit 102 of FIG. 1 is formed to have a size equal to or smaller than the pupil size of people, i.e., 8 mm or less. By forming the reflective unit 103 to be equal to or smaller than the pupil size as described above, the depth of field for light entering the pupil through the reflective unit 102 may be made almost infinite, i.e., considerably deep.

In this case, the depth of field refers to a range within which an image for augmented reality is recognized as being in focus. When the depth of field increases, this means that the focal distance for an image for augmented reality increases. Accordingly, even when a user changes the focal distance for the real world while gazing at the real world, an image for augmented reality is always recognized as being in focus regardless of such a change. This may be viewed as a type of pinhole effect.

Accordingly, a user may always view a clear virtual image for an image for augmented reality even when he or she changes the focal distance while gazing at a real object in the real world.

Meanwhile, when a plurality of reflective units 102 are arranged based on this principle, a viewing angle may be increased.

FIG. 2 shows an example of an optical device 200 for augmented reality using a plurality of reflective units 102, and is a side view that is viewed from a side when the optical device 200 for augmented reality is placed in front of a pupil 105.

The optical device 200 for augmented reality of FIG. 2 has the advantage of having a wider viewing angle than the case of FIG. 1 because the plurality of reflective units 102 are arranged inside the optical means 101. However, when the focal position of a user is inconsistent with the reference depth of a virtual image, a problem may arise in that the virtual image is observed as being discontinuous at the boundaries of the plurality of reflective units 102.

FIG. 3 shows views illustrating a problem occurring at the boundaries between the plurality of reflective units 102.

In FIG. 3, each hexagon represents a virtual image shown to a user by one reflective unit 102.

FIG. 3(a) corresponds to a case where the focal position of a user is consistent with the reference depth of a virtual image, in which case no particular problem occurs at the boundaries of the reflective units 102 bounded by the circle.

FIG. 3(b) corresponds to a case where the focal position of a user is inconsistent with the reference depth of a virtual image, in which case it can be seen that a virtual image is out of sync and thus appears overlapped or split at the boundaries of the reflective units 102 indicated by the hexagons.

FIG. 3(c) corresponds to a case where the focal position of a user is significantly inconsistent with the reference depth of a virtual image, in which case the virtual image appears more severely overlapped or split at the boundaries of the reflective units 102 indicated by the hexagons.

As described above, in the case where the plurality of reflective units 102 are used, when the focal position of a user is inconsistent with a reference depth designed for a virtual image, a problem arises in that a virtual image is out of sync at the boundaries of the plurality of reflective units 102, so that the virtual image cannot be seen clearly. This phenomenon becomes more severe as the inconsistency between the reference depth set for the virtual image and the focal position of the user increases.
[Patent Document 1]
Korean Patent 10-1660519 (published on Sep. 29, 2016)

DISCLOSURE

Technical Problem

The present invention has been conceived to overcome the above-described problems, and an object of the present invention is to provide an optical device for augmented reality having a function of adjusting the depth of a virtual image that is capable of preventing the out-of-sync phenomenon of a virtual image that may occur at the boundaries of a plurality of reflective units.

Technical Solution

In order to accomplish the above object, the present invention provides an optical device for augmented reality having a function of adjusting the depth of a virtual image, the optical device including: a display unit configured to display a virtual image; focusing optics configured to refract or reflect virtual image light output from the virtual image displayed on the display unit; a reflective unit including a plurality of reflective modules configured to provide the virtual image to a user by reflecting and transferring the virtual image light, refracted or reflected by the focusing optics, toward a pupil of the user's eye; an optical means provided with the reflective unit including the plurality of reflective modules installed therein, and configured to transmit real object image light, output from a real object, toward the pupil of the user's eye; a position adjustment device configured to move at least one of the display unit and the focusing optics in a direction parallel to the optical axis of the focusing optics; a focal length tracking unit configured to measure the focal length of the user; and a control unit configured to control the movement of the position adjustment device based on the focal length of the user measured by the focal length tracking unit; wherein the control unit controls the movement of the position adjustment device so that the depth of the virtual image displayed on the display unit corresponds to the focal length of the user measured by the focal length tracking unit.

In this case, the focusing optics may be a collimator.

Furthermore, each of the plurality of reflective modules may be formed to have a size of 4 mm or less.

Furthermore, the position adjustment device may move at least one of the display unit and the focusing optics in a direction parallel to the optical axis of the focusing optics based on a control signal from the control unit.

Furthermore, the control unit may control the movement of the position adjustment device so that the depth d of the virtual image corresponds to the focal length of the user measured by the focal length tracking unit, based on an equation below:

$$d = d_0 + \frac{gf}{g-f}$$

where d is the depth of the virtual image, $d_0$ is a distance between the optical unit and the focusing optics, g is the distance between the display unit and the focusing optics, and f is the focal length of the focusing optics.

Furthermore, the control unit may control the movement of the position adjustment device by adjusting g, which is the distance between the focusing optics and the display unit, so that the depth d of the virtual image corresponds to the focal length of the user measured by the focal length tracking unit.

Furthermore, the control unit may control the movement of the position adjustment device by adjusting $d_0$, which is the position of the focusing optics, so that the depth d of the virtual image corresponds to the focal length of the user measured by the focal length tracking unit.

Furthermore, the control unit may control the movement of the position adjustment device by adjusting both $d_0$, which is the position of the focusing optics, and g, which is the distance between the focusing optics and the display unit, so that the depth d of the virtual image corresponds to the focal length of the user measured by the focal length tracking unit.

Moreover, the focusing optics may be a variable focus lens; and the control unit may control the movement of the position adjustment device by adjusting f, which is the focal length of the focusing optics, so that the depth d of the virtual image corresponds to the focal length of the user measured by the focal length tracking unit.

Advantageous Effects

According to the present invention, there can be provided the optical device for augmented reality having a function of adjusting the depth of a virtual image that is capable of preventing the out-of-sync phenomenon of a virtual image that may occur at the boundaries of a plurality of reflective units.

BEST MODE

Embodiments of the present invention will be described in detail below with reference to the accompanying drawings.

Figure 4:
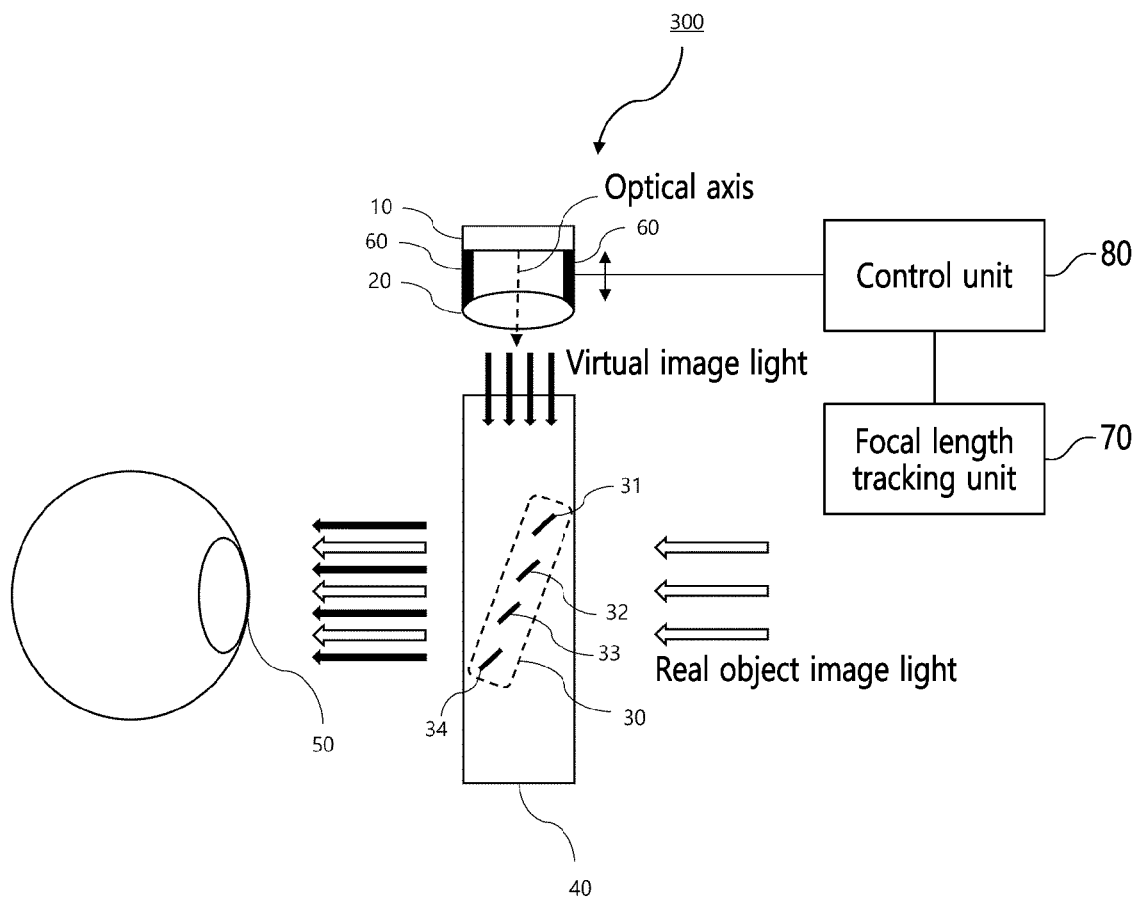
FIG. 4 shows an embodiment of an optical device (300) for augmented reality having a function of adjusting the depth of a virtual image according to the present invention.

FIG. 4 shows an embodiment of an optical device for augmented reality having a function of adjusting the depth of a virtual image (hereinafter simply referred to as the "optical device 300 for augmented reality") according to the present invention.

Referring to FIG. 4, the optical device 300 for augmented reality according to the present embodiment includes a display unit 10, focusing optics 20, a reflective unit 30, an optical means 40, a position adjustment device 60, a focal length tracking unit 70, and a control unit 80.

The display unit 10 is a means for displaying a virtual image.

The display unit 10 may be composed of a display device, such as a small-sized LCD, that outputs virtual image light, which is image light corresponding to a virtual image, through a screen by displaying the virtual image on the screen.

In this case, the virtual image refers to an image that is displayed on the screen of the display unit 10 and transferred to the user's pupil 50 through the focusing optics 20 and the reflective unit 30, and may be a still image or a moving image in the form of an image.

Since the display unit 10 itself is not a direct target of the present invention and is known in the prior art, a detailed description thereof will be omitted herein.

This virtual image is transferred to the user's pupil 50 together with real object image light, which is image light output from a real object present in the real world and transferred through the optical means 40, so that the user is provided with an augmented reality service in which the virtual image and the real object are superimposed on each other.

The focusing optics 20 are a means for refracting or reflecting virtual image light output from a virtual image displayed on the display unit 10.

The focusing optics 20 transfer virtual image light to the reflective unit 30 by refracting or reflecting the virtual image light. For example, it may be a lens such as a collimator that refracts virtual image light displayed on the display unit 10 and outputs it as parallel light.

In addition, there may be used various other optical elements composed of a combination of at least one of other reflective means, refractive means, and diffractive means for transferring virtual image light to the reflective unit 30 of the optical means 40.

Since this focusing optics 20 are also not a direct target of the present invention and are known in the prior art, a detailed description thereof will be omitted herein.

The reflective unit 30 performs a function of providing a virtual image to the user by reflecting and transferring the virtual image light, refracted or reflected by the focusing optics 20, toward the pupil 50 of the user's eye.

The reflective unit 30 is composed of a plurality of reflective modules 31 to 34. The reflective modules 31 to 34 are each arranged to have an appropriate inclination angle inside the optical means 40 by considering the positions of the focusing optics 20 and the pupil 50 so that they can each transfer the virtual image light, transferred from the focusing optics 20, to the user's pupil 50 by reflecting the virtual image light.

Figure 1:
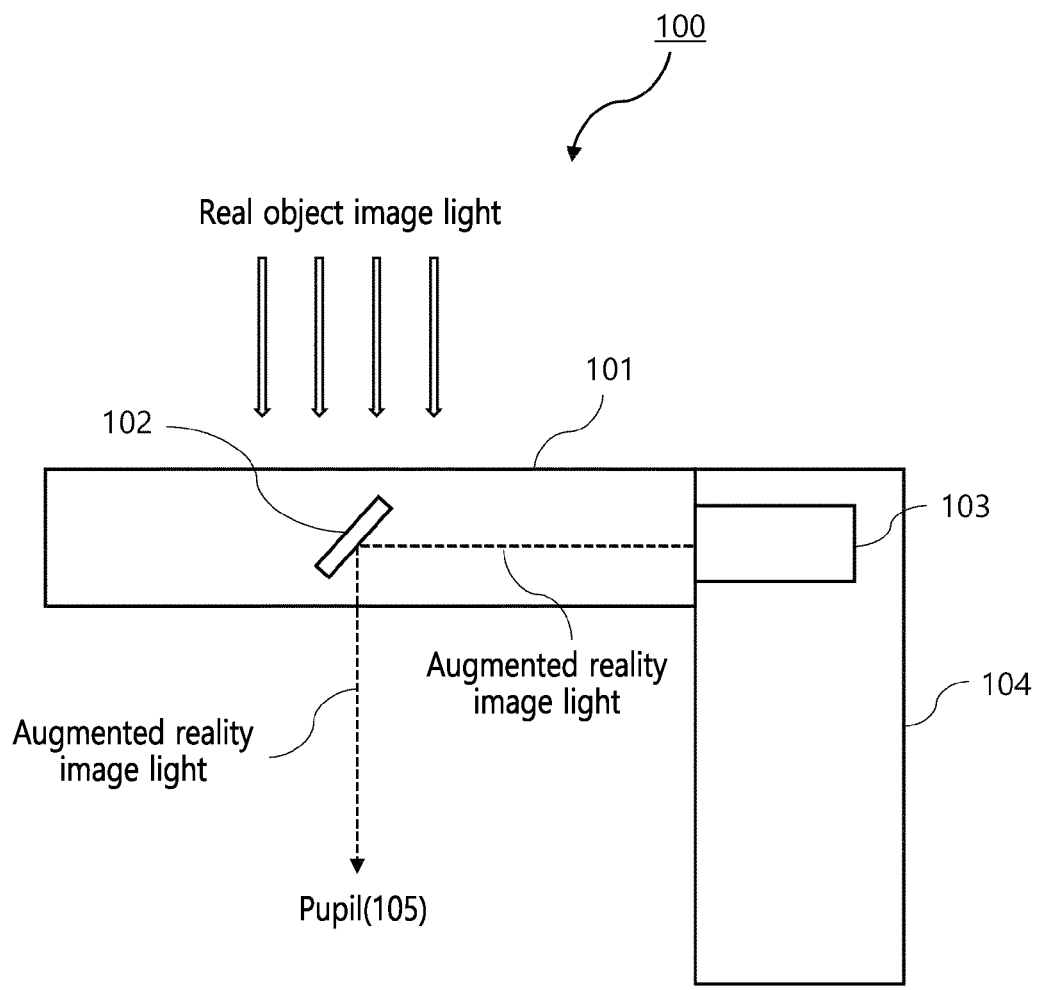
FIG. 1 is a diagram showing the optical device (100) for augmented reality as disclosed in patent document 1.
Figure 2:
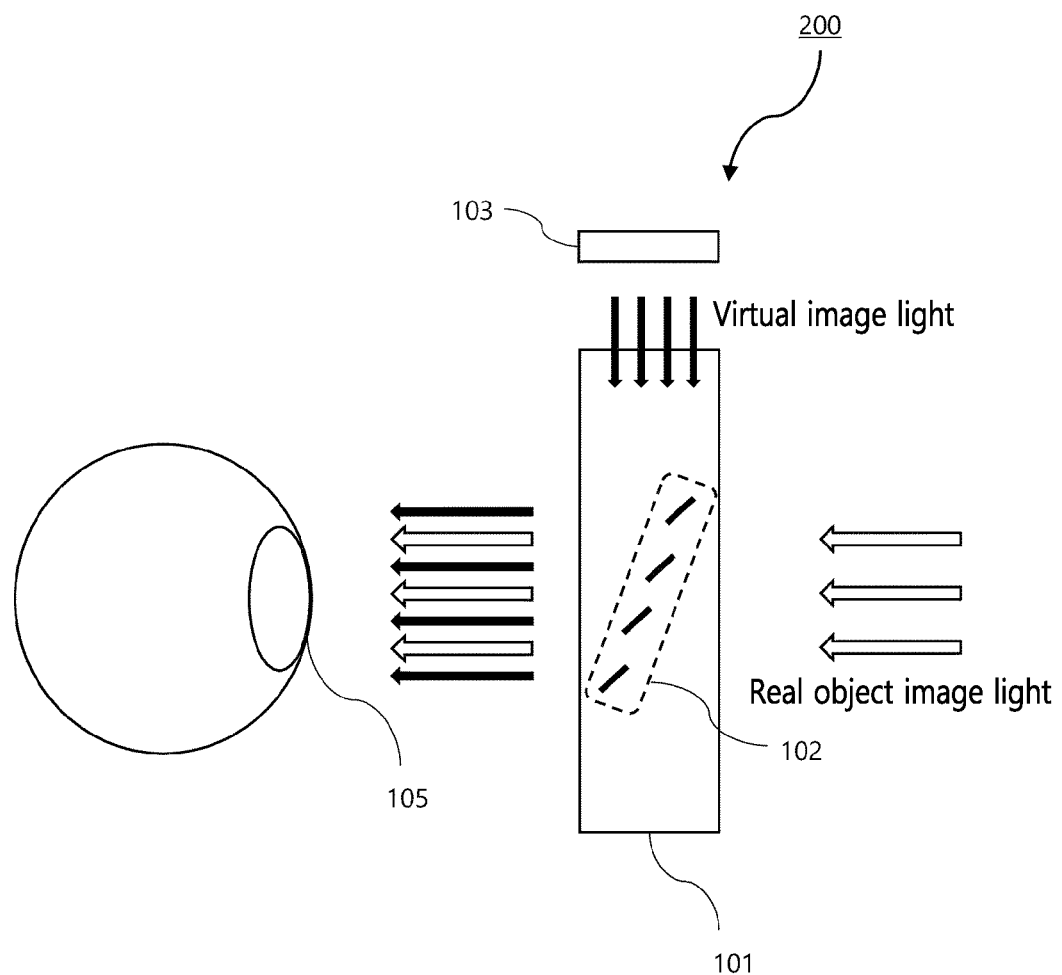
FIG. 2 shows an example of an optical device (200) for augmented reality using a plurality of reflective units (102), and is a side view that is viewed from a side when the optical device (200) for augmented reality is placed in front of a pupil (105)

As described above with reference to FIG. 1, each of the reflective modules 31 to 34 has a size smaller than that of a human pupil, i.e., 8 mm or less, more preferably 4 mm or less, in order to obtain a pinhole effect by increasing the depth of field.

In other words, each of the reflective modules 31 to 34 is formed to have a size smaller than that of the average pupil of people, i.e., 8 mm or less, more preferably 4 mm or less. By this, the depth of field for the light incident onto the pupil through each of the reflective modules 31 to 34 may be made almost infinite, i.e., considerably deep.

Therefore, there may be achieved a pinhole effect that, even when a user changes a focal length for the real world while gazing at the real world, allows a virtual image to be always recognized as being in focus regardless of such a change.

Meanwhile, in the present invention, when the size of the reflective modules 31 to 34 is excessively small, a diffraction phenomenon in the reflective modules 31 to 34 increases, so that the size of each of the reflective modules 31 to 34 is preferably larger than, e.g., 0.3 mm.

In this case, the size of each of the reflective modules 31 to 34 may be the maximum length between any two points on the edge boundary line of each of the reflective modules 31 to 34.

Alternatively, the size of each of the reflective modules 31 to 34 may be the maximum length between any two points on the edge boundary of an orthographic projection obtained by projecting each of the reflective modules 31 to 34 onto a plane including the center of the pupil 50 while being perpendicular to a straight line between the pupil 50 and each of the reflective modules 31 to 34.

Meanwhile, the reflective modules 31 to 34 are each arranged not to block the virtual image light output from the focusing optics 20 from being transferred to the other reflective modules 31 to 34.

From FIG. 4, it can be seen that, when the optical means 40 is placed in front of the pupil 50, the display unit 10 and the focusing optics 20 are arranged above the optical means 40, and the reflective modules 31 to 34 are arranged to be inclined with respect to the optical axis of the focusing optics 20 in order not to block virtual image light to be transferred to the other reflective modules 31 to 34.

In this case, the optical axis refers to a straight line that passes through the center of the focusing optics 20.

The optical means 40 is a means in which the reflective unit 30 composed of the plurality of reflective modules 31 to 34 is disposed and which transmits the real object image light, output from a real object, therethrough toward the pupil 50 of the user's eye.

Although the optical means 40 transmits all of the real object image light therethrough toward the pupil 50 in this case, it may transmit only a part of the real object image light therethrough toward the pupil 50.

The optical means 40 may be formed of a lens made of glass or plastic material or other synthetic resin material, and may have various refractive indices and transparencies.

The position adjustment device 60 performs a function of moving at least one of the display unit 10 and the focusing optics 20 along a direction parallel to the optical axis of the focusing optics 20.

In other words, the position adjustment device 60 moves at least one of the display unit 10 and the focusing optics 20 in a direction parallel to the optical axis of the focusing optics 20 based on a control signal from the control unit 80.

The position adjustment device 60 may be composed of, e.g., a motor and a means for converting the rotational movement of the motor into linear movement.

Figure 5:
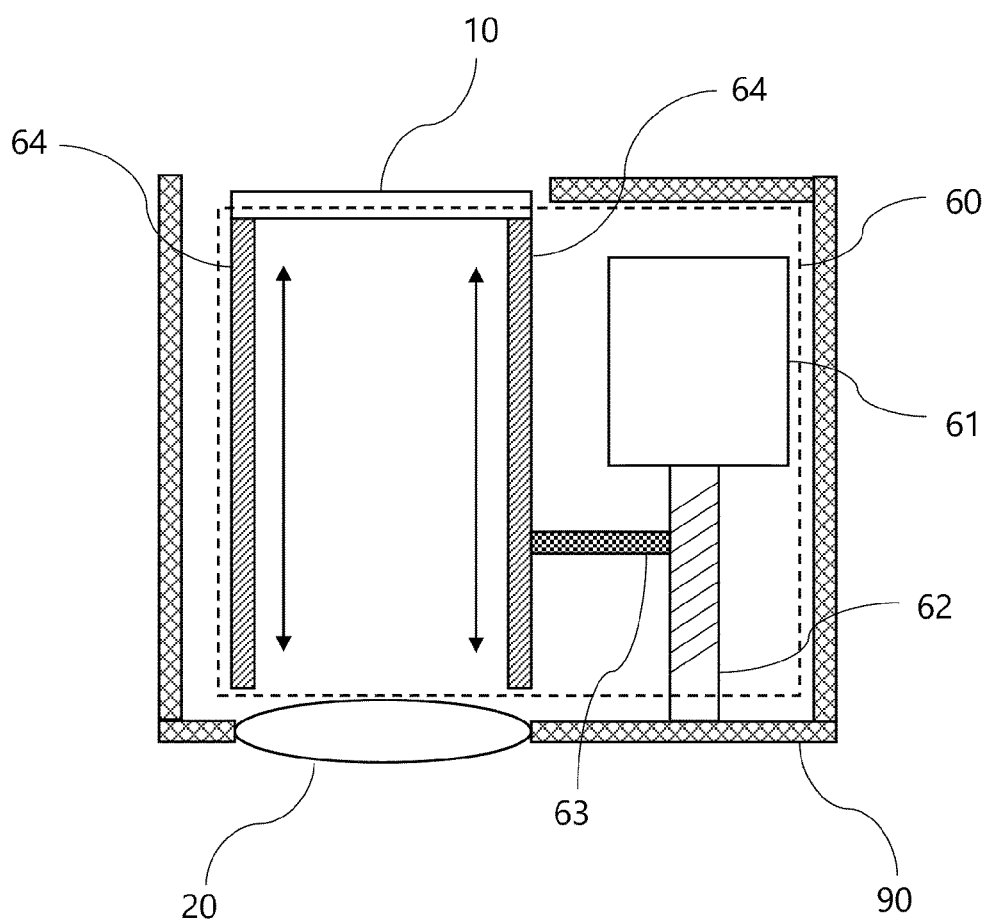
FIG. 5 is a diagram illustrating an example of the configuration of a position adjustment device (60), and shows a cross-sectional view of a housing (90) in which the position adjustment device (60), a display unit (10), and focusing optics (20) are arranged.

FIG. 5 is a diagram illustrating an example of the configuration of the position adjustment device 60, and shows a cross-sectional view of a housing 90 in which the position adjustment device 60, the display unit 10, and the focusing optics 20 are arranged.

Referring to FIG. 5, the display unit 10 and the focusing optics 20 are arranged inside the housing 90, and the focusing optics 20 is fixed to the bottom surface of the housing 90. The display unit 10 is not fixed to the housing 90.

Furthermore, a motor 61, a screw part 62, a protrusion part 63, and a movable part 64 constituting the position adjustment device 60 are arranged inside the housing 90.

The motor 61 is rotated in a forward or reverse direction in response to a control signal from the control unit 80, and the screw part 62 is coupled with the rotating shaft of the motor 61 and rotated in the direction in which the motor 61 is rotated. In addition, a screw thread is formed on the screw part 62.

The protrusion part 63 is fixedly coupled to the movable part 64 and engaged with the thread of the screw part 62. Accordingly, when the screw part 62 is rotated, the protruding part 63 is moved in any one of the directions parallel to the optical axis (the directions of the arrows) along the thread of the screw part 62. Therefore, the movable part 64 is also moved in the same direction.

Since the movable part 64 is not fixed to the housing 90, it is moved upward or downward depending on the rotation direction of the motor 60. Accordingly, the display unit 10 is also moved in any one of the upward and downward directions, i.e., in any one of the directions parallel to the optical axis of the focusing optics 20.

Although the position adjustment device 60 of FIG. 5 corresponds to a case where the focusing optics 20 are fixed and only the display unit 10 is movable, it is obvious that the opposite case may also be possible.

Furthermore, it is obvious that it may be possible to couple the position adjustment device 60 to each of the display unit 10 and the focusing optics 20 and move both the display unit 10 and the focusing optics 20.

In the present invention, it is obvious that the position adjustment device 60 may employ other appropriate configurations capable of moving at least one of the display unit 10 and the focusing optics 20 in response to a control signal from the controller 80 instead of the configuration illustrated in FIG. 5.

Referring back to FIG. 4, the focal length tracking unit 70 and the control unit 80 will be described.

The focal length tracking unit 70 is a means for measuring the focal length of a user.

The focal length tracking unit 70 tracks and measures the focal length of the real world at which a user gazes in real time, and transmits it to the control unit 80.

The focal length tracking unit 70 may be implemented by, e.g., a depth camera and an eye tracking device. Since the focal length tracking unit 70 is not a direct target of the present invention and a conventionally known art may be employed as the focal length tracking unit 70, a detailed description thereof will omitted herein.

The control unit 80 is a means for controlling the movement of the position adjustment device 60 based on the focal length of the user measured by the focal length tracking unit 70.

In other words, the control unit 80 controls the movement of the position adjustment device 60 so that the depth of a virtual image displayed on the display unit 10 corresponds to the focal length of the user measured by the focal length tracking unit 70.

Figure 6:
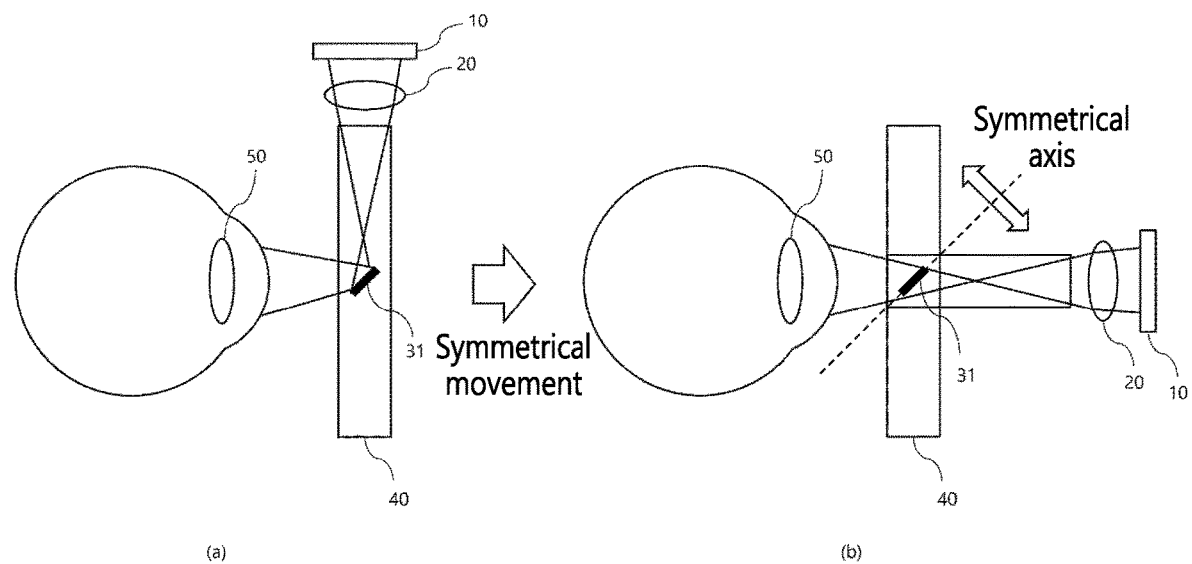
FIGS. 6 and 7 are diagrams illustrating the operations of a control unit (80) and the position adjustment device (60)
Figure 7:
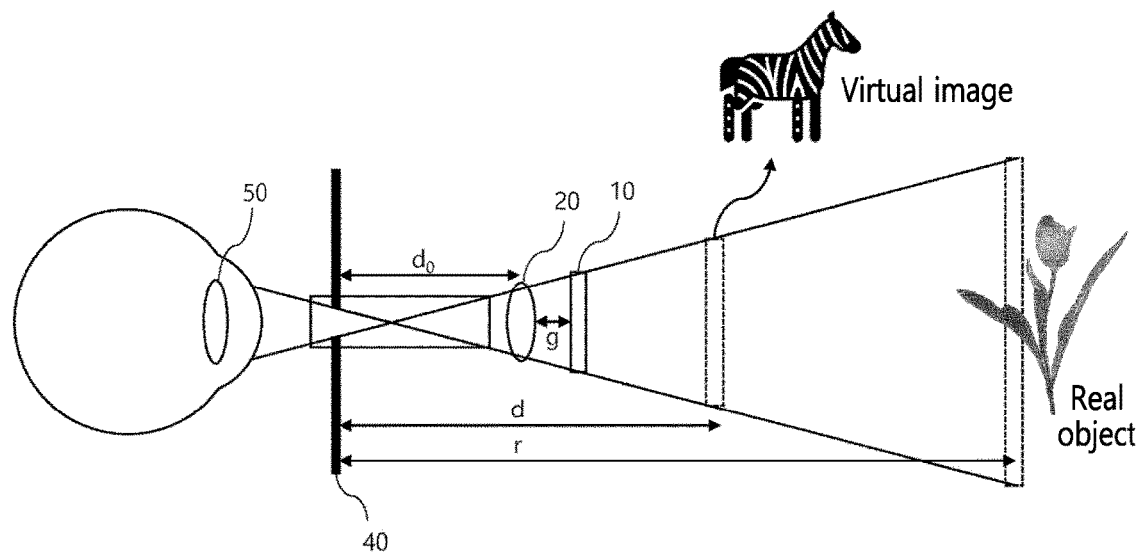

FIGS. 6 and 7 are diagrams illustrating the operations of the control unit 80 and the position adjustment device 60.

FIG. 6(*a*) briefly shows the optical device 300 for augmented reality of FIG. 4, and shows only one reflective module 31 for convenience of description.

FIG. 6(*b*) shows the display unit 10 and focusing optics 20 of FIG. 6(*a*) that have been symmetrically moved by using a vertical line passing through the surfaces of the reflective module 31 as a symmetrical axis.

FIG. 7 shows a pinhole instead of the reflective module 31 in FIG. 6(*b*). FIG. 7 shows an equivalent optical system in which the reflective module 31 is replaced with a pinhole in FIG. 6(*a*). Since they are optically the same and thus have an optically equivalent relationship, the following description will be given with reference to FIG. 7 below.

In FIG. 7, an imaginary vertical line passing through the center of the pupil corresponds to the central axis of the optical means 40.

In the equivalent optical system of FIG. 7, the depth d of a virtual image may be expressed by Equation 1 below:

$$d = d_0 + \frac{gf}{g-f} \qquad (1)$$

In this case, d denotes the depth of the virtual image. The depth of the virtual image is the position where the virtual image is observed by the user, and refers to the distance from the optical means 40 to the position where the user recognizes the virtual image to be located.

Furthermore, $d_0$ is the distance between the optical unit 40 and the focusing optics 20, and g is the distance between the display unit 10 and the focusing optics 20. Furthermore, f is the focal length of the focusing optics 20.

This may be derived from the following lens formula.

If d is the depth of the virtual image, e.g., the distance from the optical means 40 to the virtual image, $$\frac{1}{d-d_0} + \frac{1}{g} = \frac{1}{f}.$$

In the lens formula, $d_0=0$ in the case of a general lens. However, an offset of $d_0$ is applied in order to use the reflective module 31 replaced with the pinhole as a basis.

This is arranged as follows:

$$\frac{1}{d-d_0} = \frac{1}{f} - \frac{1}{g} = \frac{g-f}{gf}$$

$$d - d_0 = \frac{gf}{g-f} \rightarrow d = d_0 + \frac{gf}{g-f}$$

Figure 3:
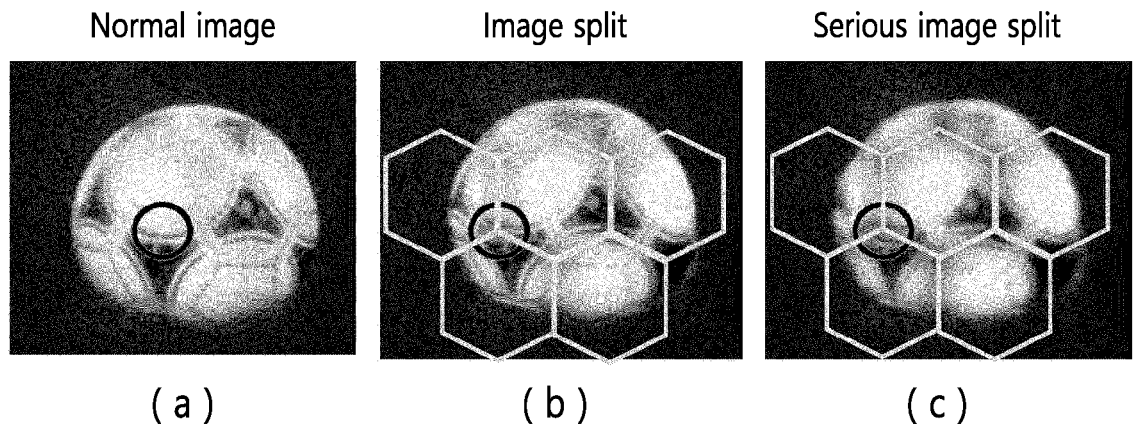
FIG. 3 shows views illustrating a problem occurring at the boundaries between the plurality of reflective units (102)

Based on this principle, when the depth d of the virtual image is made to correspond to the focal length of the user measured by the focal length tracking unit 70, a clear virtual image may always be acquired without a problem in which a virtual image is out of sync and thus appears overlapped or split at the boundaries between the reflective modules 31 to 34, as described with reference to FIG. 3.

Since f (the focal length of the focusing optics 20) is a fixed value, the depth d of the virtual image is determined by a method of fixing $d_0$ (which is the position of the focusing optics 20) and adjusting g, i.e., the distance between the focusing optics 20 and the display unit 10.

In this case, the position of the focusing optics 20 is fixed, so that g may be adjusted by moving the display unit 10 in a direction parallel to the optical axis.

When the focal length of the user measured by the focal length tracking unit 70 is r, the control unit 80 calculates g satisfying d=r and transmits a control signal adapted to move the position of the display unit 10 to correspond to g to the position adjustment device 60.

As described above with reference to FIG. 5, the position adjustment device 60 rotates the motor 61 and the screw part 62 based on a control signal transmitted from the control unit 80. Accordingly, the moving unit 64 is moved in one of the vertical directions (the directions of the arrows) by the protrusion part 63, and thus adjustment is performed to correspond to the distance between the display unit 10 and the focusing optics 20, i.e., g calculated by the control unit 80.

As another method, there may be used a method of adjusting $d_0$, i.e., the position of the focusing optics 20. In this method, there may be used a method of adjusting only $d_0$ while maintaining g at a fixed value, and a method of adjusting $d_0$ and g simultaneously.

Even in this case, the control unit 80 adjusts the depth d of the virtual image by calculating $d_0$ satisfying d=r or $d_0$ and g and then transmitting a control signal adapted to move the positions of the focusing optics 20 and the display unit 10 in order to correspond thereto to the position adjustment device 60, as described above.

Figure 8:
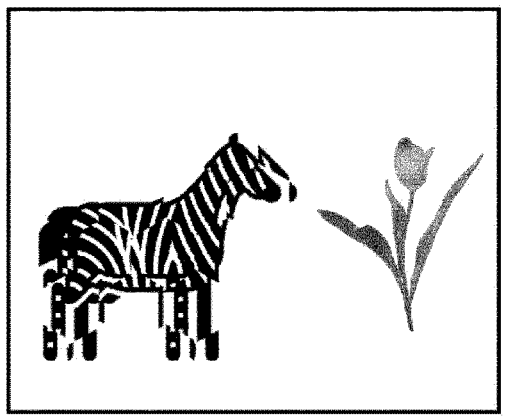
FIG. 8 is an augmented reality screen showing a virtual image and real-world object that are observed by a user.
Figure 8:
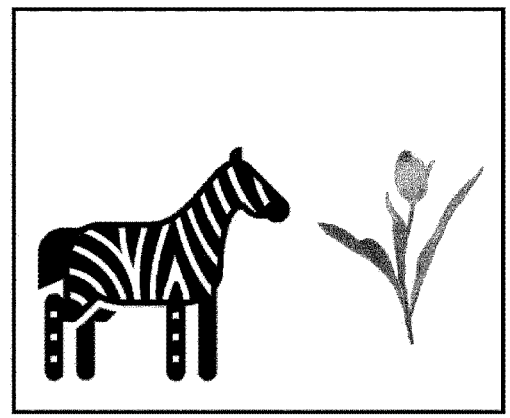

FIG. 8 is an augmented reality screen showing a virtual image and real-world object that are observed by a user.

FIG. 8(*a*) shows a case in which, when a user sets a focal length to a real-world object (the flower) located at a long distance, a virtual image (the zebra) appears out of sync. The reason for this is that the designed depth d of the virtual image and the focal length of the user do not match each other, as described above.

FIG. 8(*b*) shows a case in which the depth d of the virtual image is adjusted to correspond to the focal length of the user based on the principle described above. As shown in this drawing, it can be seen that both the virtual image (the zebra) and the real-world object (the flower) to which the user has set a focal length are clearly observed without an out-of-sync phenomenon.

Meanwhile, although the focusing optics 20 has been described as having a fixed focal length f in the above embodiment, a variable focus lens capable of changing a focal length f may be employed.

The variable focus lens refers to an optical element capable of changing a focus by changing a refractive index or the like via a combination of chemical substances and an electrical, chemical, or physical signal.

Since the variable focus lens itself is not a direct target of the present invention and a variable focus lens known in the prior art may be employed, a detailed description thereof is omitted herein.

When the variable focus lens is used, the depth d of the virtual image may be adjusted by adjusting f in Equation 1 above. In this case, there may be used a method of adjusting only f, or a method of adjusting a combination of one or more of f, g, and $d_0$ in combination with the method described above.

While the present invention has been described with reference to the preferred embodiments of the present invention above, it is obvious that the present invention is not limited to the above embodiments but various modifications and alterations may be possible.

The invention claimed is:

1. An optical device for augmented reality having a function of adjusting a depth of a virtual image, the optical device comprising:
a display unit configured to display a virtual image;
focusing optics configured to refract or reflect virtual image light output from the virtual image displayed on the display unit;
a reflective unit including a plurality of reflective modules configured to provide the virtual image to a user by reflecting and transferring the virtual image light, refracted or reflected by the focusing optics, toward a pupil of the user's eye;
an optical means provided with the reflective unit including the plurality of reflective modules installed therein, and configured to transmit real object image light, output from a real object, toward the pupil of the user's eye;
a position adjustment device configured to move at least one of the display unit and the focusing optics in a direction parallel to an optical axis of the focusing optics;
a focal length tracking unit configured to measure a focal length of the user; and
a control unit configured to control movement of the position adjustment device based on the focal length of the user measured by the focal length tracking unit;
wherein the control unit controls the movement of the position adjustment device so that a depth of the virtual image displayed on the display unit corresponds to the focal length of the user measured by the focal length tracking unit.

2. The optical device of claim 1, wherein the focusing optics is a collimator.

3. The optical device of claim 1, wherein each of the plurality of reflective modules is formed to have a size of 4 mm or less.

4. The optical device of claim 1, wherein the position adjustment device moves at least one of the display unit and the focusing optics in a direction parallel to the optical axis of the focusing optics based on a control signal from the control unit.

5. The optical device of claim 4, wherein the control unit controls the movement of the position adjustment device so that the depth d of the virtual image corresponds to the focal length of the user measured by the focal length tracking unit, based on an equation below:

$$d = d_0 + \frac{gf}{g-f}$$

where d is the depth of the virtual image, $d_0$ is a distance between the optical unit and the focusing optics, g is a distance between the display unit and the focusing optics, and f is a focal length of the focusing optics.

6. The optical device of claim 5, wherein the control unit controls the movement of the position adjustment device by adjusting g, which is the distance between the focusing optics and the display unit, so that the depth d of the virtual image corresponds to the focal length of the user measured by the focal length tracking unit.

7. The optical device of claim 5, wherein the control unit controls the movement of the position adjustment device by adjusting $d_0$, which is a position of the focusing optics, so that the depth d of the virtual image corresponds to the focal length of the user measured by the focal length tracking unit.

8. The optical device of claim 5, wherein the control unit controls the movement of the position adjustment device by adjusting both $d_0$, which is a position of the focusing optics, and g, which is the distance between the focusing optics and the display unit, so that the depth d of the virtual image corresponds to the focal length of the user measured by the focal length tracking unit.

9. The optical device of claim 5, wherein:
the focusing optics is a variable focus lens; and
the control unit controls the movement of the position adjustment device by adjusting f, which is the focal length of the focusing optics, so that the depth d of the virtual image corresponds to the focal length of the user measured by the focal length tracking unit.

* * * * *